(12) United States Patent
Chaudhari et al.

(10) Patent No.: US 11,544,510 B2
(45) Date of Patent: Jan. 3, 2023

(54) SYSTEM AND METHOD FOR MULTI-MODAL IMAGE CLASSIFICATION

(71) Applicant: comScore, Inc., Reston, VA (US)

(72) Inventors: Yogen Chaudhari, Reston, VA (US); Sean Pinkney, Reston, VA (US); Prashanth Venkatraman, Reston, VA (US); Ashwath Rajendran, Reston, VA (US); Jay Parikh, Reston, VA (US)

(73) Assignee: Comscore, Inc., Reston, VA (US)

( * ) Notice: Subject to any disclaimer, the term of this patent is extended or adjusted under 35 U.S.C. 154(b) by 42 days.

(21) Appl. No.: 16/509,062

(22) Filed: Jul. 11, 2019

(65) Prior Publication Data

US 2021/0012145 A1   Jan. 14, 2021

(51) Int. Cl.
*G06K 9/62* (2022.01)
*G06Q 30/02* (2012.01)
*G06N 3/08* (2006.01)
*G06F 40/10* (2020.01)
*G06V 30/148* (2022.01)

(52) U.S. Cl.
CPC ............ *G06K 9/628* (2013.01); *G06F 40/10* (2020.01); *G06K 9/6256* (2013.01); *G06K 9/6264* (2013.01); *G06K 9/6269* (2013.01); *G06N 3/08* (2013.01); *G06Q 30/0201* (2013.01); *G06Q 30/0241* (2013.01); *G06V 30/153* (2022.01)

(58) Field of Classification Search
CPC ................................. G06F 40/10; G06N 3/08
See application file for complete search history.

(56) References Cited

U.S. PATENT DOCUMENTS

| | | | |
|---|---|---|---|
| 8,768,050 B2* | 7/2014 | Kannan ............... | G06K 9/6227 382/161 |
| 10,007,863 B1* | 6/2018 | Pereira ................ | G06K 9/6267 |
| 2018/0121533 A1* | 5/2018 | Magnani .............. | G06F 16/248 |
| 2019/0188835 A1* | 6/2019 | Loginov ................ | G06T 5/002 |
| 2020/0090007 A1* | 3/2020 | Joseph ................ | G06K 9/3233 |
| 2020/0327351 A1* | 10/2020 | Abedini ............... | G06K 9/3258 |

OTHER PUBLICATIONS

Advertisement detection, segmentation and classification for newspaper images and website snapshots, by Chu et al., 2016 International computer symposium (Year: 2016).*

* cited by examiner

*Primary Examiner* — Vikkram Bali
(74) *Attorney, Agent, or Firm* — Blank Rome LLP

(57) ABSTRACT

Systems and methods for classifying images (e.g., ads) are described. An image is accessed. Optical character recognition is performed on at least a first portion of the image. Image recognition is performed via a convolutional neural network on at least a second portion of the image. At least one class for the image is automatically identified, via a fully connected neural network, based on one or more predictions, each of the one or more predictions being based on both the optical character recognition and the image recognition. Finally, the at least one class identified for the image is output.

19 Claims, 5 Drawing Sheets

Feature extraction by a CNN via layers (e.g., convolutional, ReLU, pooling)   Classification via fully connected output layer

SYSTEM AND METHOD FOR MULTI-MODAL IMAGE CLASSIFICATION

TECHNICAL FIELD

The present disclosure relates to a systems and methods for detecting and classifying advertisement (ad) media (e.g., from among images) and, more particularly, for classifying ad media using trained deep learning models.

BACKGROUND

Image classification, which is a well-known problem in the field of computer vision, pertains to how computers can learn aspects of digital images or videos. Companies typically manually classify images, costing significant sums of money. That is, manual classification is performed by a human answering questions with respect to displayed images. Current approaches often produce misclassifications due to human error, and they are both unreliable and slow. A problem often encountered is that the media to be classified may be of a different type (e.g., video of one of a variety of different video formats, image of one of a variety of different image formats, GIF, etc.) and different size. Further, media, especially for advertisements (ads), can be of low resolution and/or low contrast.

Known image classification techniques are based on support vector machines (SVMs), but they are underperforming. Other approaches may rely on a brute force matching approach for logo or brand recognition, these types of operations performing slowly and being costly. Known techniques further do not extract text from advertisements for logo or brand recognition.

There is thus a need for an approach that is more accurate, is faster, has unlimited scope of classification (e.g., scalable), has a low recurring cost, and that is more reliable.

SUMMARY

Systems and methods are disclosed for classifying images (e.g., ads) using artificial neural networks. Accordingly, one or more aspects of the present disclosure relate to a method for classifying by: accessing an image; performing optical character recognition on at least a first portion of the image; performing image recognition via a convolutional neural network (CNN) on at least a second portion of the image; automatically identifying, via a fully connected neural network, at least one class for the image based on one or more predictions, each of the one or more predictions being based on both the optical character recognition and the image recognition; and outputting the at least one class identified for the image. The method is implemented by one or more hardware processors configured by machine-readable instructions and/or other components.

Yet another aspect of the present disclosure relates to a system configured for image (e.g., ad) classification. The system comprises one or more processors and other components or media, e.g., upon which machine-readable instructions may be executed to classify images using the mentioned method. Implementations of any of the described techniques may include a method or process, an apparatus, a device, a machine, a system, or instructions stored on computer-readable storage device(s).

BRIEF DESCRIPTION OF THE DRAWINGS

The details of particular implementations are set forth in the accompanying drawings and description below. Other features will be apparent from the following description, including the drawings and claims. The drawings, though, are for the purposes of illustration and description only and are not intended as a definition of the limits of the disclosure.

DETAILED DESCRIPTION OF EXEMPLARY EMBODIMENTS

As used throughout this application, the word "may" is used in a permissive sense (i.e., meaning having the potential to), rather than the mandatory sense (i.e., meaning must). The words "include", "including", and "includes" and the like mean including, but not limited to. As used herein, the singular form of "a", "an", and "the" include plural references unless the context clearly dictates otherwise. As employed herein, the term "number" shall mean one or an integer greater than one (i.e., a plurality).

Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

Presently disclosed are ways of classifying media (e.g., ad media, on-demand video, live-streaming video, or other imagery). Such media may be any type of content, but for the sake of a clear explanation, most of the examples provided herein relate to advertisement (ad) content.

Figure 1:
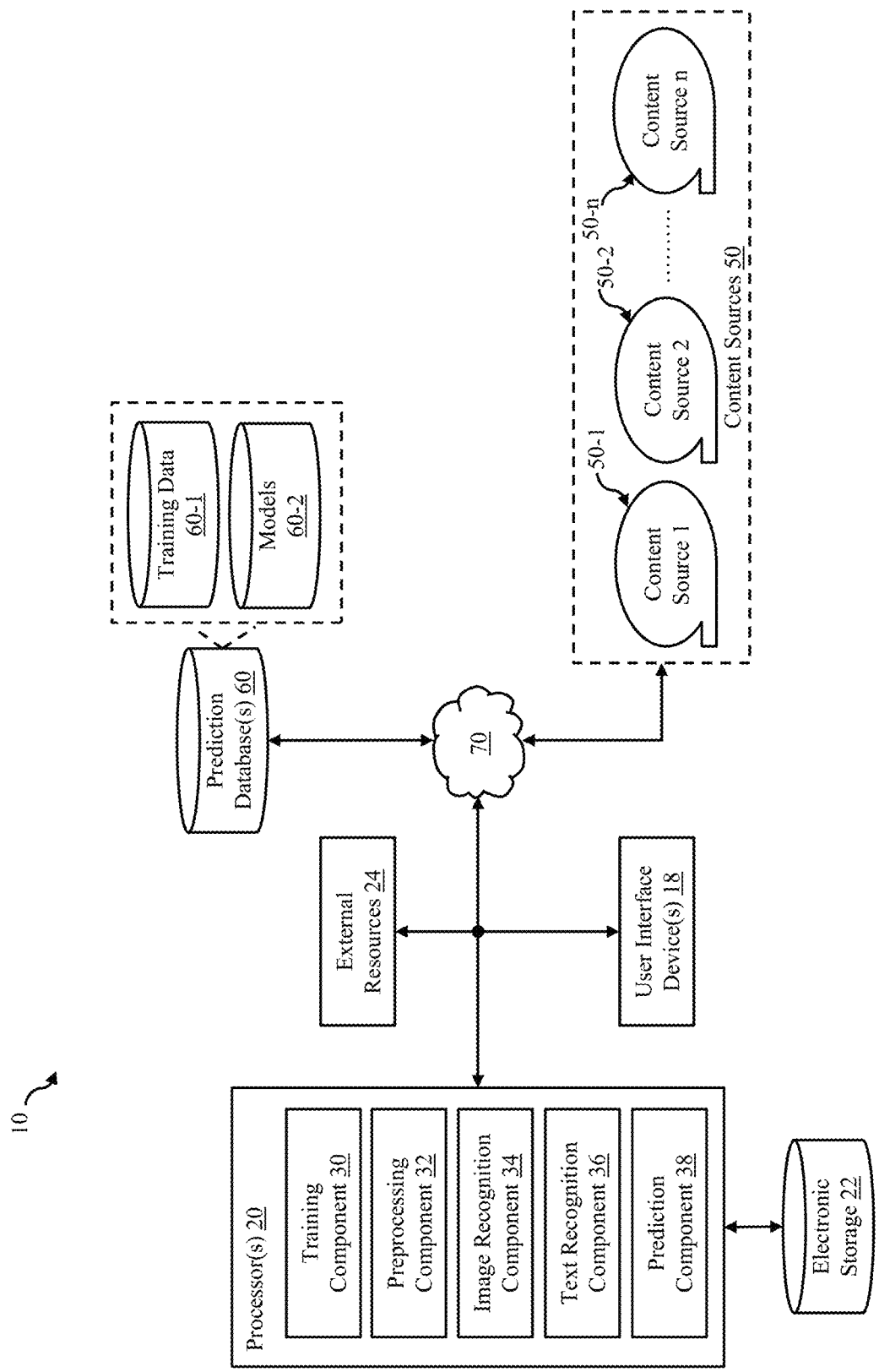
FIG. 1 schematically illustrates a system configured for preparing and using one or more prediction models to detect and classify ad media, in accordance with one or more embodiments.

FIG. 1 illustrates a system 10 configured to prepare and use one or more prediction models, for ad detection and classification with respect to images, in accordance with one or more embodiments. System 10 may be configured to remotely obtain images (e.g., ad media) from content source 50. System 10 may be configured to further obtain other input data, including panel data, set top box (STB) data, and over the top (OTT) data. Such input data may be obtained from any suitable source, e.g., from one or more of content sources 50 via network 70. Each content source may be a user device, system, server, or another source of content. For example, thousands, millions, or even hundreds of millions of images may be obtained from one or more content sources. At least some of these obtained images may be used to determine (e.g., "train") neural networks, and these images may be referred to as a training data set.

An artificial neural network may be configured to determine a classification (e.g., type of ad) based on input media. An artificial neural network is a network or circuit of artificial neurons or nodes for solving artificial intelligence (AI) problems. Such artificial networks may be used for predictive modeling.

The prediction models may be and/or include one or more neural networks (e.g., deep neural networks, artificial neural networks, or other neural networks), other machine learning models, or other prediction models. As an example, the neural networks referred to variously herein may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory, in their effect on the activation state of connected neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from input layers to output layers). In some embodiments, back propagation techniques may be utilized to train the neural networks, where forward stimulation is used to reset weights on the "front" neural units. In some embodiments, stimulation and inhibition for neural networks may be more free-flowing, with connections interacting in a more chaotic and complex fashion.

A convolutional neural network (CNN) is a sequence of hidden layers, such as convolutional layers interspersed with activation functions. Typical layers of a CNN are thus a convolutional layer, an activation layer, batch normalization, and a pooling layer. Each output from one of these layers is an input for a next layer in the stack, the next layer being, e.g., another one of the same layer or a different layer. For example, a CNN may have two sequential convolutional layers. In another example, a pooling layer may follow a convolutional layer. When many hidden, convolutional layers are combined, this is called deep stacking.

Convolutional layers apply a convolution operation to an input to pass a result to the next layer. That is, these layers may operate by convolving a filter matrix with the input image, the filter being otherwise known as a kernel or receptive field. Filter matrices may be based on randomly assigned numbers that get adjusted over a certain number of iterations with the help of a backpropagation technique. Filters may be overlaid as small lenses on parts, portions, or features of the image, and use of such filters lends to the mathematics behind performed matching to break down the image. That is, by moving the filter around to different places in the image, the CNN may find different values for how well that filter matches at that position. For example, the filter may be slid over the image spatially to compute dot products after each slide iteration. From this matrix multi-plication, a result is summed onto a feature map.

The area of the filter may be a small amount of pixels (e.g., 5) by another small amount of pixels (e.g., 5). But filters may also have a depth, the depth being a third dimension. This third dimension may be based on each of the pixels having a color (e.g., RGB). For this reason, CNNs are often visualized as three-dimensional (3D) boxes. For the sake of simplicity, FIG. 3 does not explicitly show the third dimension.

In the disclosed CNN, a first convolutional layer may learn edges and bright or dark spots of an image (e.g., light and dark spots of a person's eyes). A second convolutional layer may use the learned edges to learn shapes or other recognizable features, the second layer often resulting in pattern detection to activate for more complex shapes. And a third or subsequent convolutional layer may recognize an entire object (e.g., recognize a face) from within the image.

An exemplary CNN may comprise an M×N×O filter (e.g., 5×5×3 pixels, M, N, and O each being any suitable integer) filter that initially convolves over at least a portion of an image, which may be 32×32×3 pixels. Ad 160, depicted in FIG. 3, may therefore be a 32×32×3 image, but this is not intended to be limiting, and filters may be used for a same spatial location with different values in the filters. The disclosed convolution(s) may be performed by overlaying a filter on a spatial location of the image (e.g., the ad) and multiplying all the corresponding values together at each spatial location as the filter convolves (e.g., slides, corre-lates, etc.) across the image one pixel (spatial location) at a time. In some embodiments, the filters for one layer may be of different number and size than filters of other layers. Also, the stride does not have to be one spatial location at a time. For example, a CNN may be configured to slide the filter across two or three spatial locations each iteration.

After each convolutional layer, it is conventional to apply a nonlinear (activation) layer immediately afterward, such as a ReLU, Softmax, Sigmoid, tan h, Softmax, and/or Leaky layer. For example, ReLUs may be used to change negative values (e.g., from the filtered images) to zero.

In some embodiments, a batch normalization layer may be used. The batch normalization layer may be used to normalize an input layer by adjusting and scaling the acti-vations. Batch normalization may exist before or after an activation layer. To increase the stability of a neural network, batch normalization normalizes the output of a previous activation layer by subtracting the batch mean and dividing by the batch standard deviation.

In some embodiments, a pooling layer (e.g., maximum pooling, average pooling, etc.) may be used. For example, maximum pooling is a way to shrink the image stack by taking a maximum value in each small collection of an incoming matrix (e.g., the size of a filter). Shrinking is practical for large images (e.g., 9000×9000 pixels). The resulting stack of filtered images from convolutional layer(s) may therefore become a stack of smaller images.

A first phase of the disclosed CNN is feature extraction from images via a combination of one or more of the mentioned layers, and then classification for prediction is performed in a second phase via one or more fully connected layers. The final, output layer of a CNN may thus be a fully connected neural network, which may precisely identify an object in the input image or identify a characteristic of the object or of the image as a whole. In addition, to prevent overfitting of the image, some embodiments may use drop-out, as a generalization technique. The fully connected layers of FIG. 3 connect every neuron in one layer to every neuron in other layer(s). In direct contrast, the neurons of preceding layers in the CNN may only have local connec-tions (e.g., with respect to nearby pixels). Before reaching the fully connected layer, some embodiments may flatten the output from a previous layer. The flattened matrix may then go through a fully connected layer for classifying the image.

The fully connected neural network of disclosed embodi-ments may draw associations between extracted textual features and recognized image elements. That is, in some embodiments, the fully connected layer(s) may be fed image features from the convolutional blocks of the image recog-nition path and fed textual features from the character recognition path. This layer may then output an image classification prediction. In other words, OCR block 150 extracts text from across the image and represents the image as a collection of the text present in it, and term representation block 154 vectorizes this output to represent the images as terms present in its vocabulary. For example, an image may be determined to display the text "Kangol." In some embodiments, term representation block 154 performs term-frequency inverse-document-frequency (TF-IDF) statistics, word/text embeddings, TF-IDF weighted embeddings, or other suitable functionality to identify term(s) (e.g., as vectors). In this example, the image may be further determined to display a hat-like object, via the CNN, the CNN thus making the determination that the image is an ad of Kangol (Kangol may or may not be a part of the vocabulary from the OCR and fed to the TFIDF vectorization). This neural network would thus associate the recognized text with the image of the hat. As such, the vectors created from both paths are fed into the fully connected neural network as inputs.

The structure of the CNN (e.g., number of layers, types of layers, connectivity between layers, and one or more other structural aspects) may be selected, and then the parameters of each layer may be determined by training. Some embodiments may train the CNN by dividing a training data set into a training set and an evaluation set and then by using the training set. Training prediction models with known data improves accuracy and quality of outputs. Training data may be derived from any number of sources, as will be discussed in further detail below.

Figure 3:
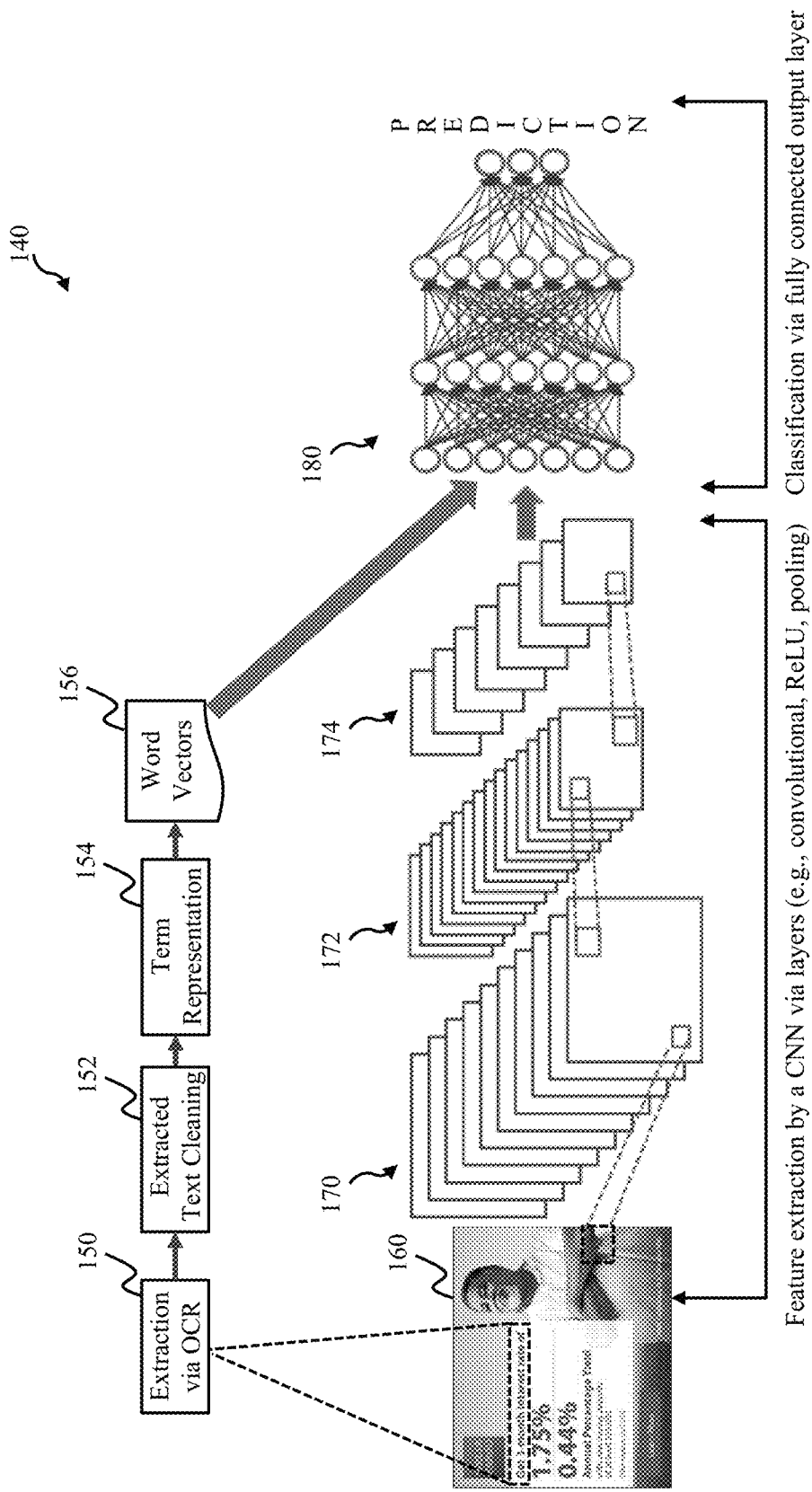
FIG. 3 illustrates a sequence flow of two different paths for detecting and classifying ad media using neural networks, in accordance with one or more embodiments.

Once trained, prediction model 140 of FIG. 3 may operate at a rate of 100 images/minute, more than 1,000 images per minute, or more than 10,000 images per minute. Training component 30 of FIG. 1 may thus prepare one or more prediction models to generate predictions. For example, a prediction model may analyze its predictions against a reference set of data called the validation set. In some use cases, the reference outputs may be provided as input to the prediction models, which the prediction model may utilize to determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input images. For example, a labeled training set may enable model improvement. That is, the training model may use a validation set of data to iterate over model parameters until the point where it arrives at a final set of parameters/weights to use in the model.

In some embodiments, the input ad media is one of a series of images (e.g., video, GIFs, or other media). For example, this approach could be applied to video advertisements, advertisements in live or on-demand streaming, advertisement within OTT content, and television ads by converting such content into static images and performing ad media recognition from the extracted static images. System 10 may process a single image or a series of images to determine from among such input a presence of an ad, category, or brand, e.g., by using a last or penultimate frame in a series of frames of a GIF. The GIF may then be converted into static images, and these images may then be run through method 300 of FIG. 5 to recognize shapes, categories of shapes, brands, text, etc.

Other applications of the disclosed approach may involve merging this technology with real-time data services (e.g., Proximic of Comscore), for contextual data for online advertisers and agencies. Similarly, the disclosed approach may be merged with a text crawler. The disclosed approach may also be used with respect to paid search marketing, e.g., where businesses advertise within sponsored listings of a search engine or partner site by paying either each time their ad is clicked or when their ad is displayed.

FIG. 1 illustrates system 10, which is configured to prepare and use one or more prediction models for detecting and classifying ad media, in accordance with one or more embodiments. System 10 may be configured to receive content (e.g., ads and other images) and perform subsequent processing.

Electronic storage 22 of FIG. 1 comprises electronic storage media that electronically stores information. The electronic storage media of electronic storage 22 may comprise system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 22 may be (in whole or in part) a separate component within system 10, or electronic storage 22 may be provided (in whole or in part) integrally with one or more other components of system 10 (e.g., a user interface device 18, processor 20, etc.). In some embodiments, electronic storage 22 may be located in a server together with processor 20, in a server that is part of external resources 24, in user interface devices 18, and/or in other locations. Electronic storage 22 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 22 may store software algorithms, information obtained and/or determined by processor 20, information received via user interface devices 18 and/or other external computing systems, information received from external resources 24, and/or other information that enables system 10 to function as described herein.

External resources 24 may include sources of information (e.g., databases, websites, etc.), external entities participating with system 10, one or more servers outside of system 10, a network (e.g., the Internet), electronic storage, equipment related to Wi-Fi technology, equipment related to Bluetooth® technology, data entry devices, and/or other resources. In some implementations, some or all of the functionality attributed herein to external resources 24 may be provided by resources included in system 10. External resources 24 may be configured to communicate with processor 20, user interface device 18, electronic storage 22, and/or other components of system 10 via wired and/or wireless connections, via a network (e.g., a local area network and/or the Internet), via cellular technology, via Wi-Fi technology, and/or via other resources.

User interface device(s) 18 of system 10 may be configured to provide an interface between one or more users and system 10. User interface devices 18 are configured to provide information to and/or receive information from the one or more users. User interface devices 18 include a user interface and/or other components. The user interface may be and/or include a graphical user interface configured to present views and/or fields configured to receive entry and/or selection with respect to particular functionality of system 10, and/or provide and/or receive other information. In some embodiments, the user interface of user interface devices 18 may include a plurality of separate interfaces associated with processors 20 and/or other components of system 10. Examples of interface devices suitable for inclusion in user interface device 18 include a touch screen, a keypad, touch sensitive and/or physical buttons, switches, a keyboard, knobs, levers, a display, speakers, a microphone, an indicator light, an audible alarm, a printer, and/or other interface devices. The present disclosure also contemplates that user interface devices 18 include a removable storage interface. In this example, information may be loaded into user interface devices 18 from removable storage (e.g., a smart card, a flash drive, a removable disk) that enables users to customize the implementation of user interface devices 18.

In some embodiments, user interface devices 18 are configured to provide a user interface, processing capabilities, databases, and/or electronic storage to system 10. As such, user interface devices 18 may include processors 20, electronic storage 22, external resources 24, and/or other components of system 10. In some embodiments, user interface devices 18 are connected to a network (e.g., the Internet). In some embodiments, user interface devices 18 do not include processor 20, electronic storage 22, external resources 24, and/or other components of system 10, but instead communicate with these components via dedicated lines, a bus, a switch, network, or other communication means. The communication may be wireless or wired. In some embodiments, user interface devices 18 are laptops, desktop computers, smartphones, tablet computers, and/or other user interface devices.

Data and content may be exchanged between the various components of the system 10 through a communication interface and communication paths using any one of a number of communications protocols corresponding to the different media delivery platforms. In one example, data may be exchanged employing a protocol used for communicating data across a packet-switched internetwork using, for example, the Internet Protocol Suite, also referred to as TCP/IP. The data and content may be delivered using datagrams (or packets) from the source host to the destination host solely based on their addresses. For this purpose the Internet Protocol (IP) defines addressing methods and structures for datagram encapsulation. Of course other protocols also may be used. Examples of an Internet protocol include Internet Protocol Version 4 (IPv4) and Internet Protocol Version 6 (IPv6).

In some embodiments, processor 20 may belong to a user device, a consumer electronics device, a mobile phone, a smartphone, a personal data assistant, a digital tablet/pad computer, a wearable device, a personal computer, a laptop computer, a notebook computer, a work station, a server, a vehicle computer, a game or entertainment system, a set-top-box or any other device. As such, processor 20 is configured to provide information processing capabilities in system 10. Processor 20 may comprise one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some embodiments, processor 20 may comprise a plurality of processing units. These processing units may be physically located within the same device (e.g., a server), or processor 20 may represent processing functionality of a plurality of devices operating in coordination (e.g., one or more servers, user interface devices 18, devices that are part of external resources 24, electronic storage 22, and/or other devices).

As shown in FIG. 1, processor 20 is configured via machine-readable instructions to execute one or more computer program components. The computer program components may comprise one or more of training component 30, preprocessing component 32, image recognition component 34, text recognition component 36, prediction component 38, and/or other components. Processor 20 may be configured to execute components 30, 32, 34, 36, and/or 38 by: software; hardware; firmware; some combination of software, hardware, and/or firmware; and/or other mechanisms for configuring processing capabilities on processor 20.

It should be appreciated that although components 30, 32, 34, 36, and 38 are illustrated in FIG. 1 as being co-located within a single processing unit, in embodiments in which processor 20 comprises multiple processing units, one or more of components 30, 32, 34, 36, and/or 38 may be located remotely from the other components. The description of the functionality provided by the different components 30, 32, 34, 36, and/or 38 described below is for illustrative purposes, and is not intended to be limiting, as any of components 30, 32, 34, 36, and/or 38 may provide more or less functionality than is described. For example, one or more of components 30, 32, 34, 36, and/or 38 may be eliminated, and some or all of its functionality may be provided by other components 30, 32, 34, 36, and/or 38. As another example, processor 20 may be configured to execute one or more additional components that may perform some or all of the functionality attributed below to one of components 30, 32, 34, 36, and/or 38.

Figure 2:
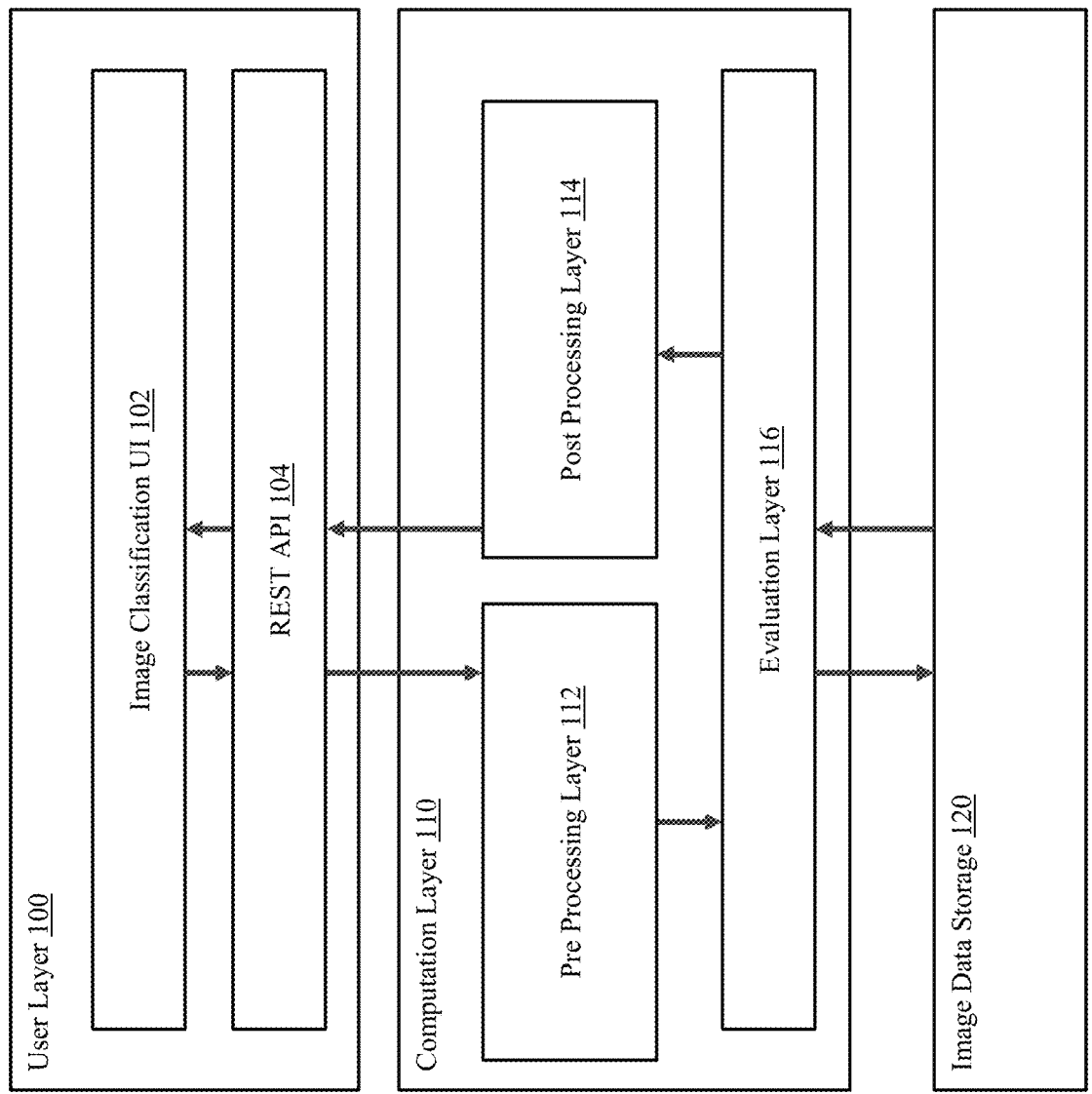
FIG. 2 illustrates a block diagram of a layered architecture for facilitating ad media detection and classification, in accordance with one or more embodiments.

FIG. 2 illustrates a block diagram of a layered architecture for facilitating ad media detection and classification, in accordance with one or more embodiments. This architecture may comprise user layer 100, computation layer 110, and image data storage 120. User layer 100 may comprise an image classifier user interface (UI) 102 and RESTful application program interface (API) 104. That is, the user layer may be implemented via a web service API that adheres, e.g., to the representational state transfer (REST) architectural constraints, resulting in the RESTful API. User layer 100 may be implemented with such tools as the Django web framework, the Flask micro-web framework, and the Python programming language. As such, at least some of the operations of processor 20 may be developed using any suitable language, such as the Python language, as it facilitates several machine learning tools, solutions, and open source libraries.

Computation layer 110, of FIG. 2, may comprise preprocessing layer 112, post-processing layer 114, and evaluation layer 116. System 10's computation layer 110 may be implemented via any cloud service (e.g., Amazon web services (AWS), Microsoft Azure, etc.), Ubuntu operating system, and Python. As is demonstrable with respect to FIG. 2, image data storage 120 may comprise any suitable data storage, such as a mongoDB, which is a cross-platform document-oriented database program, and/or Amazon's simple storage service (S3) of its AWS, which provides object storage through a web service interface. More specifically, image data storage 120 may be implemented via a structured query language (SQL) server and an intelligence tool for understanding the display advertising market, such as Comscore's Ad Metrix. System 10 may be implemented via one or more other database management tools, such as the Pivotal Greenplum database.

A model implementing a neural network may be trained using training data obtained by training component 30 from training data 60-1 storage/database, demonstrable with respect to FIG. 1. This training data obtained from prediction database 60 of FIG. 1 may comprise hundreds, thousands, or even millions of images. For example, a data set may comprise thousands (e.g., 15,000) of images of a mix of ads and non-ads. The data set may further comprise thousands (e.g., 15,000) of ads from several (e.g., 7 to 20) different categories. The data set may further comprise thousands (e.g., 20,000) of ads from several (e.g., 10 to 500) different brands. The data set may be split between training, validation, and test sets in any suitable fashion. For example, some embodiments may use 80% of the images and ads for training or validation, and the other 20% may be used for validation or testing. The validation set may be a subset of the training data, which is kept hidden from the model to test accuracy of the model. The test set may be a dataset, which is new to the model to test accuracy of the model. The training data set used to train prediction model 140 may leverage, via training component 30, an SQL Server and a Pivotal Greenplum database for data storage and extraction purposes.

In some embodiments, training component 30 is configured to obtain training images from content source 50, electronic storage 22, external resources 24, and/or via user interface device(s) 18. In some embodiments, training component 30 is connected to network 70 (e.g., the Internet). The connection to network 70 may be wireless or wired. In some embodiments, content source 50 may be panel data. That is, images may be obtained from any content source(s), e.g., from panel users (i.e., those that have certain software installed on their machines that detects that the user has been exposed to certain content and forwards information related to this exposure to processor 20).

In some embodiments, training component 30 may enable one or more prediction models to be trained. The training of the neural networks may be performed via several iterations. For each training iteration, a classification prediction (e.g., output of layer 174 or of layer 180 of FIG. 3) of the neural network(s) may be determined and compared to the corresponding, known classification. For example, a known ad, belonging to a known category, and depicting a known brand may be input, during the training or validation, into the neural network to determine whether the prediction model can properly predict these known classes. As such, the neural network is configured to receive at least a portion of the training data as an input feature space (e.g., input 160 of FIG. 3). Once trained, the model(s) may be stored in database/storage 60-2 of prediction database 60, as shown in FIG. 1, and then used to classify images based on visual features (e.g., characteristics of a logo or of other content in an ad) and textual features (e.g., extracted n-grams from the ad). Both of these features may be determined in preprocessing steps of the disclosed approach to perform multimodal classification.

In some embodiments, preprocessing component 32 of FIG. 1 is configured to preprocess data and images. In some embodiments, preprocessing component 32 is configured to use the open source computer vision (OpenCV) library of programming functions and the Python image library (PIL). For example, a function from the OpenCV library selected for use as part of the disclosed approach may be directed to real-time computer vision. In some embodiments, a first feature is extracted by one or more functions of the OpenCV library. Preprocessing component 32 may be further configured to preprocess images using the image magic/wand wrapper. Preprocessing component 32 may be further configured to use Pandas, which is built on Numpy, for data manipulation, data analysis, and structured data processing. After preprocessing, a classifier could operate with respect to the open-source Anaconda Distribution. Anaconda is an open source project that supports many libraries in Python and R for mathematical programming and statistical modeling.

In some embodiments, image recognition component 34 and text recognition component 36 are configured, in their post-processing operations, to use OpenCV and the PIL. In some embodiments, Pickle is used for serializing and deserializing models for storing in memory, for vocabulary files, and/or for other run-time data efficient storage.

Image recognition component 34 may be further configured to use the Keras neural network library. That is, at least one of the machine learning models may operate with an activation function from a neural network library, such as Keras. Image recognition component 34 may therefore operate with respect to Tensorflow as backend.

In some embodiments, text recognition component 36 is configured to use PyTesseract, i.e., Python's library for implementing Tesseract, which is an optical character recognition (OCR) solution for text extraction from images. That is, some embodiments may perform character recognition via an open source OCR model. Text recognition component 36 may be further configured to use a natural language toolkit (NLTK), e.g., for stemming and lemmatization. In some embodiments, text recognition component 36 may clean text via the NLTK, NLTK being Stanford University's open source library for natural language processing (NLP). That is, after obtaining a function that optically recognizes characters of at least a first portion of the image comprising an identified element, text recognition component 36 may be used to generate the text to be cleaned.

Text recognition component 36 may be further configured to use SciKit Learn, which is a machine learning library for Python. More particularly, SciKit Learn may be used for determining term-frequency inverse-document-frequency (TF-IDF) statistics, for processing text extracted from images, and for vectorizing it. When analyzing the text extracted from the image, some embodiments may score each n-gram based on an implementation of TF-IDF, which is a family of formulas. To be clear, text recognition component 36 may obtain n-grams via the recited OCR and/or the cleaning operation(s), each of the n-grams including a unique set of one or more terms. And, to perform TF-IDF processing, each of the n-grams within the input images may be numerically scored, taking into account the number of instances or frequency of the n-gram within the image (Term Frequency) and in the entire corpus (Inverse Document Frequency) of images or in some other larger sample. TF-IDF processing scores significant (e.g., "whitelist") terms and insignificant (e.g., "blacklist") terms differently such that the insignificant terms are ignored or removed. In these or other embodiments, the term vectors based on TF-IDF may be weighted.

Text recognition component 36 may, in some embodiments, form a feature vector for each image, where each term in the feature vector is a cardinal value indicating the presence of a particular n-gram. In some cases, the feature vector is an ordered list of TF-IDF scores for corresponding n-grams. In some cases, the feature vector is an ordered list of BM25 scores. That is, in some embodiments, instead of or as a complement to calculating the TF-IDF, the present disclosure contemplates calculating scores using the Okapi best match (BM) 25 function or its variants (e.g., BM11, BM15, BM25F, and BM25+). BM25 may be used as a form of ranking images according to their matching term(s) provided by a user giving its relevance in a corpus. In some implementations, BM25 may be based on a probabilistic retrieval framework that takes into account a term's IDF score, a term's frequency, an average size of images in a corpus, and one or more other variables or constants. In other embodiments, word embeddings, such as word2vec or gloves, may be used to get feature vectors of text.

In some embodiments, system 10 comprises a deep neural network powered prediction component 38. In some embodiments, prediction component 38 may be powered additionally or alternatively by one or more other types of neural networks or other types of prediction models.

In some embodiments, prediction component 38 is configured to recognize and classify an image based on its predicted ad status (e.g., ad or no ad), its predicted category, and its predicted brand. In some embodiments, prediction component 38 is operable to determine that a single image depicts more than one ad (and thus more than one category and brand). Typically, an image may belong to only one category or class in this context, the comprised ad only thus being for one brand.

As shown in FIG. 3, operations 150, 152, and 154 may be executed to generate one or more word vectors 156; this may be considered the text extraction path. Complementary to this path, as shown below it in FIG. 3, is the image recognition path using a neural network (e.g., a CNN). The image recognition path may detect image features (e.g., objects within an image using the CNN) and, using the word vectors of the text recognition path, prediction component 38 may predict one or more classifications of an image from the combined feature space.

As mentioned, FIG. 3 illustrates a sequence flow of two different paths for detecting ads from among images and classifying the ads using neural networks, in accordance with one or more embodiments. That is, FIG. 3 illustrates an example of how a neural network (e.g., prediction model 140) may be trained and subsequently used. A first path may pertain to image recognition, in which text may be extracted based on OCR 150, the extracted text may be cleaned based on NLP 152, the cleaned text may be statistically processed 154, and as a result word vectors 156 may be determined. A second path may pertain to image recognition, i.e., with respect to use of a prediction model of system 10 (FIG. 1). The prediction model may include an input layer, one or more other layers, and output layer 180, as shown in FIG. 3. The one or more other layers may comprise convolutional layer 170, activation layer 172, and pooling layer 174. The number and type of layers is not intended to be limiting. Each of the input and output layers of the neural networks depicted in FIG. 3 may comprise one or more nodes. As shown in output layer 180, artificial neurons may perform calculations using one or more parameters, and the various interconnecting lines of layer 180 represent connections from the output of one neuron to the input of another. That is, the extracted features from both of the independent paths may be combined and fed as a single input vector to the fully connected neural network to produce a prediction on the class to which the image/ad belongs.

Figure 4:
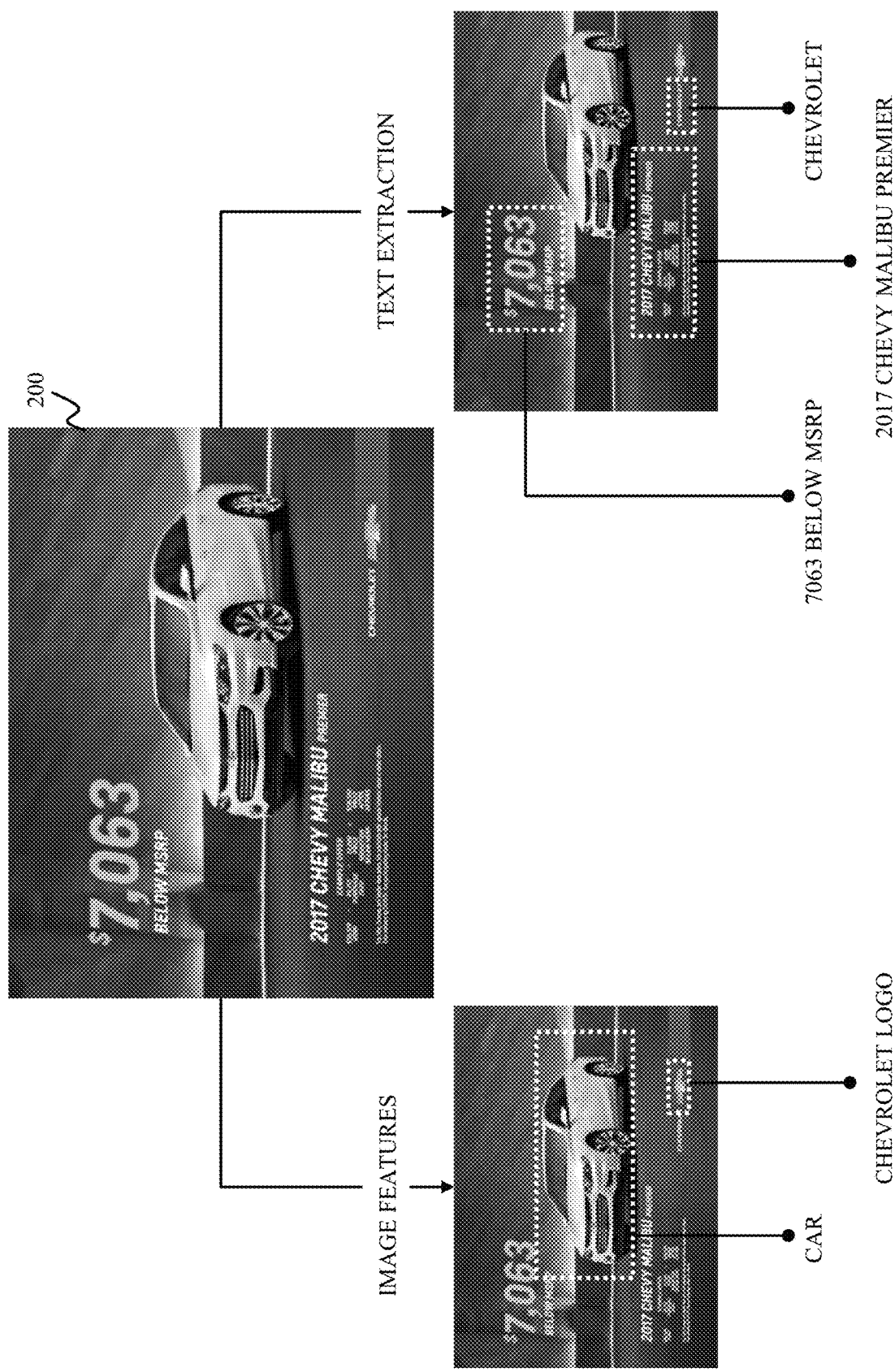
FIG. 4 illustrates an example advertisement image having textual and visual aspects that are recognized and extracted, in accordance with one or more embodiments.

FIG. 4 illustrates an example advertisement (ad) image having textual and visual aspects that are recognized and extracted, in accordance with one or more embodiments. The right-hand path of FIG. 4 pertains to text recognition, and the left-hand path of FIG. 4 pertains to image recognition. For example, from automatic analysis of ad 200, processor 20 may determine one or more of the text "Chevrolet," the text "7063 below MSRP," and the text "2017 Chevy Malibu Premier" being present. Similarly, from automatic analysis of ad 200, processor 20 may determine that the image of a "Car" is present and/or that the image of the "Chevrolet Logo" is present. The CNN may thus implicitly identify the presence of an object. Here, the identification of the car category is merely illustrated for exemplary purposes. Other exemplary categories, for neural network training, validation, test, and/or actual predictions, may be travel, automotive, finance, consumer goods, retail, restaurants, sports, entertainment, telecommunications, healthcare, computers and technology, education, and/or business services. FIG. 4 also shows identification of a brand, particularly the Chevrolet brand. Other exemplary brands, for neural network training, validation, test, and/or actual predictions, may be Toyota, BMW, Mercedes Benz, Honda, Volkswagen, etc. But this listing is not intended to be exhaustive or limiting, and these examples merely pertain to the automobile/car category. The brand may pertain to any suitable category, i.e., not just for automobiles. For example, the predicted brand may be a men's clothing brand such as Ralph Lauren or Lacoste. As such, the disclosed image classification system exemplarily determines, with respect to ad 200 of FIG. 4, that this image is indeed an advertisement, that it depicts content belonging to the automobiles category, and that it depicts a particular brand.

Figure 5:
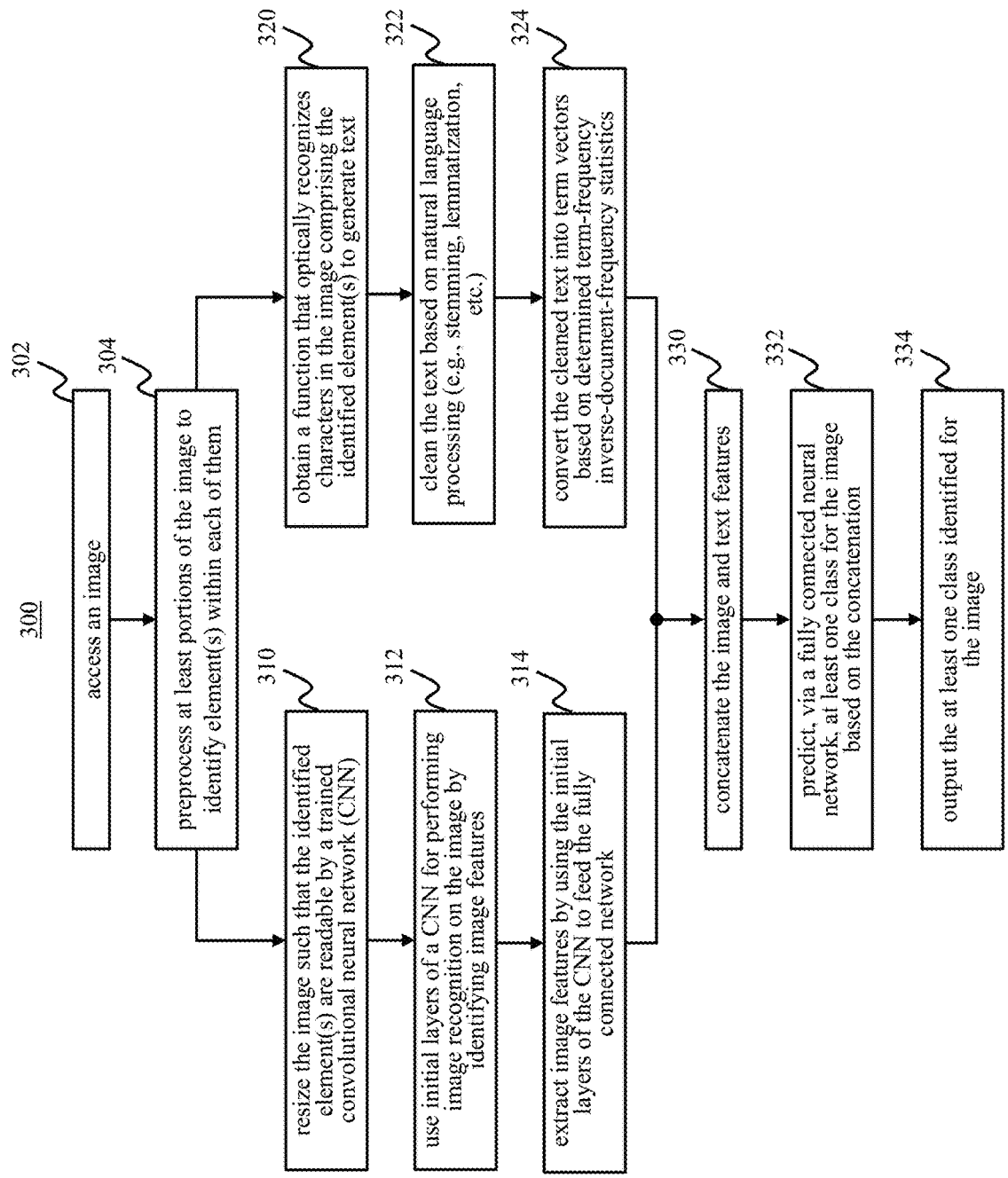
FIG. 5 illustrates a method for detecting and classifying ad media with neural networks, in accordance with one or more embodiments.

FIG. 5 illustrates method 300 for validating, testing, or using one or more prediction models for ad media detection and classification prediction, in accordance with one or more embodiments. Method 300 may be performed with a computer system comprising one or more computer processors and/or other components. The processors are configured by machine readable instructions to execute computer program components. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 5 and described below is not intended to be limiting. In some embodiments, method 300 may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of method 300 in response to instructions stored electronically on an electronic storage medium. The processing devices may include one or more devices configured through hardware, firmware, and/or software to be specifically designed for execution of one or more of the operations of method 300.

At operation 302 of method 300, an image may be accessed. As an example, the image may or may not be an ad. The image may be a video, another form of media, or extracted from such video or media. In operation 302, many images may be accessed. Method 300 may be executed using one or more images at a time. In some embodiments, operation 302 is performed by a processor component the same as or similar to preprocessing component 32 (shown in FIG. 1 and described herein).

At operation 304 of method 300, at least portions of the image may be preprocessed to identify element(s) within each of the portions. As an example, since natural images are sometimes degraded by noise or other distortions, the preprocessing may first remove at least some of the distortion based on any suitable noise removal algorithm. Then, the preprocessing may pull from a library (e.g., OpenCV) such functions as thickness erosion, thickness dilation, opening, closing, morphological gradient, top hat, black hat, and other morphological operations.

In operation 304, some embodiments may identify the element(s) by adjusting contrast in and around the one or more elements. The adjusted contrast may be based on analysis of a color, lightness, or shading in and/or around the one or more elements. This operation may be based on an assumption that color or intensity changes sharply on the boundary between different objects while remaining unchanged within an object. Since this is not always true, i.e., with large color gradient appearing on texture within one object and small color gradient appearing on object boundaries, the disclosed deep neural networks may learn hierarchical feature representations in their multiple-layer structure; this is unlike traditional shallow learning structures. By adopting CNN, the disclosed edge detection system may be free from extra feature extraction or multiple channel computation, thus being straightforward and efficient. On the other hand, the CNN may capture local patterns from images in its convolutional layers. This property also makes it a suitable tool for solving the edge detection problem because edges are usually locally correlated and exhibit specific patterns. In some embodiments, operation 304 is performed by a processor component the same as or similar to preprocessing component 32 (shown in FIG. 1 and described herein).

At operation 310 of method 300, an image may be resized such that the identified element(s) are readable by or standardized for a trained convolutional neural network (CNN). As an example, the OpenCV library or equivalent may be used at operation 310 to resize one or more portions of the image or to resize the entire image itself. In some embodiments, operation 310 is performed by a processor component the same as or similar to image recognition component 34 (shown in FIG. 1 and described herein).

At operation 312 of method 300, the CNN for performing image recognition on the image may be obtained to identify image features. As an example, the CNN may be obtained from models 60-2 of FIG. 1. That is, after training component 30 trains the neural networks, the resulting trained models may be stored in models 60-2 storage/database. As an aside, models 60-2 may further contain the fully connected neural network that is trained, obtained, and used in other operations. Some implementations of system 10 may obtain three different models from database 60-2 and utilize a same architecture, which supports at least three different purposes. A first purpose of a first model may be ad detection on images (e.g., ad versus non-ad); a second purpose of a second model may be to predict categories; and a third purpose of a third model may be brand recognition. Each of these three models may receive a same input (e.g., images), but the third model may get one additional input: category vector (e.g., a category name represented in vector form), to improve accuracy at the brand level. In some embodiments, operation 312 is performed by a processor component the same as or similar to image recognition component 34 (shown in FIG. 1 and described herein).

At operation 314 of method 300, image features may be extracted by using the initial layers of the CNN (e.g., convolutional layer, activation, pooling) to feed the fully connected neural network. The image features determined by the CNN may be based on image feature values of the image. These image feature values may represent visual features of one or more aspects of the image. A feature may be an interesting part of an image. For example, features or patterns may be one or more of textures, edges, corners, regions (which provide a complementary description of image structures, as opposed to corners that are more point-like), ridges, straight lines, T-junctions, Y-junctions, or other characteristics of the image. The disclosed feature detection of operation 314 (or of any other operation in method 300) may be a low-level image processing operation. That is, it may be performed as one of the first operations on an image, and it may examine every pixel to see if there is a feature present at that pixel. Some embodiments may only examine the image in the region of the features. The extracted image features may be in any format readily useable by the fully connected neural network. When a vector is used, these feature vectors may have any suitable type of dimension and any suitable number of dimensions. These extracted features may then be stored. In some embodiments, operation 314 is performed by a processor component the same as or similar to image recognition component 34 (shown in FIG. 1 and described herein).

At operation 320 of method 300, a function, which optically recognizes characters of at least a first portion of the image comprising the identified element(s), may be obtained to generate a first text. In some embodiments, the first text is inherently present as readable text in at least a portion of the image. Any suitable OCR technique may be used in this operation. In some embodiments, operation 320 is performed by a processor component the same as or similar to text recognition component 36 (shown in FIG. 1 and described herein).

At operation 322 of method 300, the first text may be cleaned based on one or more NLP techniques. Further, in this operation, one or more functions from the NLTK suite of text processing libraries may be used for classification, tokenization, stemming, lemmatization, tagging, parsing, and semantic reasoning of the first text. For example, stemming and lemmatization may remove or add suffixes to the first text. In some embodiments, operation 322 is performed by a processor component the same as or similar to text recognition component 36 (shown in FIG. 1 and described herein).

At operation 324 of method 300, the cleaned text may be converted into term vectors based on determined term-frequency inverse-document-frequency (TF-IDF) statistics. TF-IDF is a numerical statistic that is intended to reflect how important a word is to an image in a collection or corpus. In this case, the collection or corpus may be several thousand images, some of which may be ads. As an example, TF-IDF processing may result in word vectors. In some embodiments, operation 324 is performed by a processor component the same as or similar to text recognition component 36 (shown in FIG. 1 and described herein).

At operation 330 of method 300, feature vectors extracted from both the character recognition and the image recognition may be concatenated. In some embodiments, operation 330 is performed by a processor component the same as or similar to prediction component 38 (shown in FIG. 1 and described herein).

At operation 332 of method 300, at least one class for the image may be automatically predicted via a fully connected neural network based on the concatenation. As an example, one or more fully connected layers of the fully connected neural network may be utilized for classification. Fully connected networks are useful in this operation, since no special assumptions need to be made about the input (e.g., that the input consists of images, videos, or CNN-processed images or videos). That is, fully connected networks are structure agnostic. In some embodiments, the result of prediction model 140 may be to classify an input image into one or more groups based on whether the depicted image is an ad, to which category the depiction belongs, and to which brand the depiction belongs. In these embodiments, prior to the at least one class being identified, the image has not been identified as such previously. The fully connected layer may be any type of fully connected neural network (FCNN), such as a standard neural network, a Bayesian neural network, or another type of neural network. This flexibility in modeling the FCNN provides for a high level of confidence in made predictions, which remedies situations, e.g., where a new brand (i.e., unfamiliar to the model) has been exposed for making a prediction. The modeled FCNN provides the ability of: (i) limiting incorrect predictions of the images; (ii) detecting the presence of such images, in the data; and (iii) retraining the models accordingly. In some embodiments, operation 332 is performed by a processor component the same as or similar to prediction component 38 (shown in FIG. 1 and described herein).

At operation 334 of method 300, the at least one class predicted for the image may be outputted for any suitable purpose. In some embodiments, operation 334 is performed by a processor component the same as or similar to prediction component 38 (shown in FIG. 1 and described herein).

Techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, in machine-readable storage medium, in a computer-readable storage device or, in computer-readable storage medium for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method, comprising:
preprocessing an image to identify a plurality of elements from the image;
performing optical character recognition on at least a first element of the plurality of elements from the image to identify text in the first element;
converting the text in the first element into a term feature vector;
performing image recognition, via a convolutional neural network, on at least a second element of the plurality of elements from the image to identify an image feature;
predicting, via a fully connected neural network and a concatenation of the term feature vector and the image feature, (i) that an advertisement is present in the image, (ii) a category of the advertisement, and (iii) a brand based on the category of the advertisement; and
outputting the category of the advertisement.

2. The method of claim 1, wherein preprocessing the image comprises:
eroding or dilating thickness of the plurality of elements; or
adjusting contrast in and around the plurality of elements.

3. The method of claim 1, further comprising:
cleaning, via a natural language processing, the text in the first element.

4. The method of claim 1, further comprising:
resizing the image such that the text in the plurality of elements is recognizable by the convolutional neural network.

5. The method of claim 4,
wherein the convolutional neural network determines edges or boundaries of the plurality of elements within the resized image.

6. The method of claim 5, wherein the image feature comprises a logo of the brand.

7. The method of claim 1, wherein:
the fully connected neural network comprises a plurality of layers, each of the layers comprising a plurality of artificial neurons,
each of the neurons performs one or more calculations using one or more parameters, and
each of the neurons of a first layer of the plurality of layers is connected to each of the neurons of a second layer of the plurality of layers.

8. The method of claim 7, wherein:
the convolutional neural network comprises an input layer, a plurality of hidden layers, and an output layer,
the plurality of hidden layers comprises a convolutional layer, a rectified linear unit layer, and a pooling layer,
neurons of each of the layers transforms a three-dimensional input volume to a three-dimensional output volume of neuron activations, and
the neurons of one of the layers do not connect to all of the neurons of another of the layers.

9. The method of claim 1, wherein preprocessing the image comprises manipulating the image via a function obtained from an image library.

10. The method of claim 1, further comprising retrieving the image from a remote server.

11. The method of claim 1, wherein the category of the advertisement is at least one of travel, automotive, finance, consumer goods, retail, restaurants, sports, entertainment, telecommunications, healthcare, insurance, computer technology, education, or business services.

12. A system comprising one or more processors coupled to one or more storage devices storing instructions that, when executed, cause the one or more processors to perform the following operations:
    preprocessing an image to identify a plurality of elements from the image;
    performing optical character recognition on at least a first element of the plurality of elements from the image to identify text in the first element;
    converting the text in the first element into a term feature vector;
    performing image recognition via a convolutional neural network, on at least a second element of the plurality of elements from the image to identify an image feature;
    predicting, via a fully connected neural network and a concatenation of the term feature vector and the image feature, (i) that an advertisement is present in the image, (ii) a category of the advertisement, and (iii) a brand based on the category of the advertisement; and
    outputting the category of the advertisement.

13. The system of claim 12, wherein:
    the fully connected neural network comprises a plurality of layers, each of the layers comprising a plurality of artificial neurons,
    each of the neurons performs one or more calculations using one or more parameters, and
    each of the neurons of a first layer of the plurality of layers is connected to each of the neurons of a second layer of the plurality of layers.

14. The system of claim 13, wherein:
    the convolutional neural network comprises an input layer, a plurality of hidden layers, and an output layer,
    the plurality of hidden layers comprises a convolutional layer, a rectified linear unit layer, and a pooling layer,
    neurons of each of the layers transforms a three-dimensional input volume to a three-dimensional output volume of neuron activations, and
    the neurons of one of the layers do not connect to all of the neurons of another of the layers.

15. The system of claim 12, wherein the category of the advertisement is at least one of travel, automotive, finance, consumer goods, retail, restaurants, sports, entertainment, telecommunications, healthcare, insurance, computer technology, education, or business services.

16. A non-transitory computer-readable medium comprising instructions executable by at least one processor to perform a method, the method comprising:
    preprocessing an image to identify a plurality of elements from the image;
    performing optical character recognition on at least a first element of the plurality of elements from the image to identify text in the first element;
    converting the text in the first element into a term feature vector;
    performing image recognition, via a convolutional neural network, on at least a second element of the plurality of elements from the image to identify an image feature;
    predicting, via a fully connected neural network and a concatenation of the term feature vector and the image feature, (i) that an advertisement is present in the image, (ii) a category of the advertisement, and (iii) a brand based on the category of the advertisement; and
    outputting the category of the advertisement.

17. The medium of claim 16, wherein:
    the fully connected neural network comprises a plurality of layers, each of the layers comprising a plurality of artificial neurons,
    each of the neurons performs one or more calculations using one or more parameters, and
    each of the neurons of a first layer of the plurality of layers is connected to each of the neurons of a second layer of the plurality of layers.

18. The medium of claim 17, wherein:
    the convolutional neural network comprises an input layer, a plurality of hidden layers, and an output layer,
    the plurality of hidden layers comprises a convolutional layer, a rectified linear unit layer, and a pooling layer,
    neurons of each of the layers transforms a three-dimensional input volume to a three-dimensional output volume of neuron activations, and
    the neurons of one of the layers do not connect to all of the neurons of another of the layers.

19. The medium of claim 16, wherein the category of the advertisement is at least one of travel, automotive, finance, consumer goods, retail, restaurants, sports, entertainment, telecommunications, healthcare, insurance, computer technology, education, or business services.

* * * * *